Figure 1:
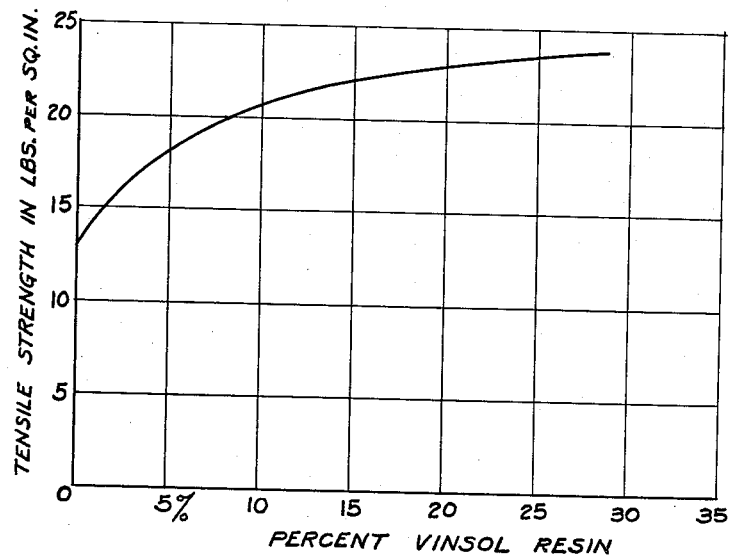

INVENTOR.
WINIFRED C. COLLINS
BY
Arnold S. Worfolk
ATTORNEY

United States Patent Office 3,012,913
Patented Dec. 12, 1961

3,012,913
UNIFIED SHEET IMPREGNATED WITH ELASTOMERIC POLYMER AND VINSOL RESIN AND PAPER BACKED NORMALLY TACKY AND PRESSURE-SENSITIVE ADHESIVE TAPE EMPLOYING SAME
Winifred C. Collins, East Brunswick, N.J., assignor, by mesne assignments, to Johnson & Johnson, New Brunswick, N.J., a corporation of New Jersey
Filed Oct. 7, 1957, Ser. No. 688,677
6 Claims. (Cl. 117—168)

This invention relates to novel unified sheeting having improved tensile strength characteristics which are particularly useful as backings of normally tacky and pressure-sensitive adhesive sheeting. The present invention also includes the manufacture of novel adhesive sheeting and particularly normally tacky and pressure-sensitive adhesive tapes having the characteristics of improved heat resistance.

Paper-backed normally tacky and pressure-sensitive adhesive tapes, particularly those used for masking purpose must have adequate tensile strength, flexibility, edge tear and elongation so that the tape may be curved to mask curved lines without tearing during application. Also, they must have satisfactory internal strength to prevent delamination of the backing upon unrolling of the tape.

Unfortunately, many of the conventional backings, which are useful in some applications as backings for adhesive tapes, are not useful in masking tapes because of their low tensile strength characteristics. Moreover, in certain applications masking tapes are subjected to high temperatures for relatively long periods of time such, for example, the baking cycles encountered in the coating of high temperature enamel finishes to a surface. The presently known tapes employed for such masking purposes such, for example, as the conventional masking tapes having kraft paper backing, when subjected to the aforesaid high temperature baking cycles, show an abnormally large loss in tensile strength as well as loss in other desirable characteristics.

Paper backings for use in pressure-sensitive tapes can be unified or strengthened internally by treatment of the paper with aqueous latices of elastomeric polymers such as crude rubber, butadiene-acrylonitrile, etc. The sheets are impregnated in amount sufficient to deposit substantial rubbery polymer solids in the web to bond the fibers thereof to a degree sufficient to lend the tape improved internal strength. In the treatment of paper webs with latices, however, it has been generally found that the edge tear, elongation and flexibility of the sheet suffered considerably whenever ingredients were incorporated in the latex for the purpose of increasing the wet tensile strength and/or delamination resistance of the product. Obviously, a balancing of the characteristics of the tape is necessary to obtain a successful commercial product and increasing one property to the severe detriment of others is not advantageous.

Accordingly, it is an object of this invention to provide a unified paper web suitable for use as a backing element for a normally tacky and pressure-sensitive adhesive sheet wherein the backing has the characteristics of improved tensile strength and adequate flexibility, elongation, edge tear and delamination resistance.

It is an additional object of this invention to provide a masking tape having the aforementioned properties.

A still further object of the invention is to provide novel adhesive sheeting, and particularly novel normally tacky and pressure-sensitive adhesive tapes, having high heat resistivity and whose backings are not deleteriously affected when subjected to high temperature conditions.

A further object of this invention is to provide novel methods for manufacturing unified sheets and adhesive sheetings having the properties set forth in the foregoing objects.

In accordance with this invention, an open, porous saturable paper is treated with an aqueous dispersion including an elastomeric component and Vinsol resin known as "Vinsol." Vinsol is a resin obtained from pine wood by extracting the wood with benzol, evaporating the extract to produce a solid residue, extracting rosin from the residue with a light petroleum hydrocarbon, and recovering the remaining insoluble residue. This final residue is soluble in alcohol but substantially insoluble in petroleum hydrocarbons such as ordinary gasoline and heptane. Vinsol resin has a melting point of 115° C. Vinsol is sold commercially in emulsion form which contains 40% Vinsol resin solids. It has been found that paper treated in the aforementioned manner shows a surprisingly improved tensile strength over paper unified with only the elastomer.

Examples of elastomeric polymers useful in this invention are the copolymers of butadiene or some other conjugated diene and an unsaturated polymerizable nitrile, e.g., acrylonitrile, alpha-methacrylonitrile, alpha-ethacrylonitrile, alpha-isopropylacrylonitrile, etc. In the above referred to copolymers, butadiene is in a major amount. Other polymers or copolymers of the elastomeric type which are suitable are natural rubber, vinyl chloride, copolymers of vinyl chloride with other monomers such as vinyl acetate, vinylidene chloride, etc., chloroprene, copolymers of butadiene and acrylic acid, methacrylic acid, ethacrylic acid, etc. containing butadiene in a major amount, and polyacrylate elastomers.

It has been found that unified papers having high heat resistivity may be formed in accordance with the teachings of this invention. The elastomer or combination of elastomers, used in the impregnant composition in combination with the Vinsol, should be of such nature so as to be able to withstand high temperature conditions. The preferred elastomers for this purpose are butadiene-acrylonitrile (70:30) copolymer ("Hycar"); butadiene-acrylic acid copolymers (85:15); butadiene-styrene copolymer (50:50) and mixtures of the foregoing. Additional examples of suitable impregnant which may be used are acrylic ester elastomers such, for example, as ethyl acrylate latex manufactured by Rohm and Haas and sold under the trade name "Rhoplex B–15." If the elastomeric material employed in the impregnant is unsaturated, the impregnant composition should contain a stabilizer which may be a single ingredient or combustion of ingredients depending upon the nature of elastomeric component or combination of elastomers employed in the impregnant composition. Thus, impregnant compositions employing an unsaturated butadiene-acrylonitrile copolymer elastomer requires a stabilizer while impregnant compositions using saturated ethyl acrylate polymers require no stabilizer. Examples of stabilizing agents which may be used are ethylene diamine tetra acetic acid sodium salt manufactured by Dow Chemical Co. and sold under the trade name "Versene," a ketone-diamylamine manufactured by Naugatuck Chemicals and sold under the trade name "Aminox," and hydroquinone monobenzyl ether manufactured by Vanderbilt Chemical Co. and sold under the trade name "Agerite Alba." "Versene" functions as a chelating agent to deactivate metallic ions which cause oxidation. "Aminox" is a heat stabilizer while "Agerite Alba" is a light stabilizer. In general, if the stabilizers of the above types are employed, the chelating agent such as "Versene" is in an amount ½ to 1½% by weight of the total impregnant composition, the heat stabilizer is in an amount ½ to 1% by weight of the total impregnant composition, and the light stabilizer is in an amount ½ to 1% by weight of the total impregnant composition.

Various types of paper may be employed as the sheet material of this invention. If the sheet material is to be impregnated with the elastomeric material and polyisocyanate together, the sheet must be in the form of a web which is porous and can be completely saturated. Preferably, paper webs of the conventional type employed as backings for normally tacky and pressure-sensitive adhesive tapes, such as those formed of kraft pulp and the like, are used. The paper may be flat or it may be creped, crimped, embossed or otherwise treated so as to provide rugosities or corrugations whereby stretchability of the sheet is increased.

Other ingredients of the type conventionally employed in latex impregnants may be employed in this invention. Exemplary of such materials are conventional antioxidants, such as hydroquinone monobenzyl, nitrogen derivatives of tetracetic acid such as the sodium salt of ethylene diamine tetra-acetic acids as disclosed in the patent to McElroy No. 2,667,522, patented January 26, 1954, pigments, dyes, etc.

In general, the impregnant is in an amount from 40 to 150%, and preferably 70 to 120%, by weight based on dry paper. For high temperature resistance properties the impregnant should be in an amount of 70% or higher by weight based on weight of dry paper. In the impregnant composition, Vinsol resin is generally in an amount from 5 to 50% by weight of total impregnant and preferably 7 to 20% by weight.

Figure 2:
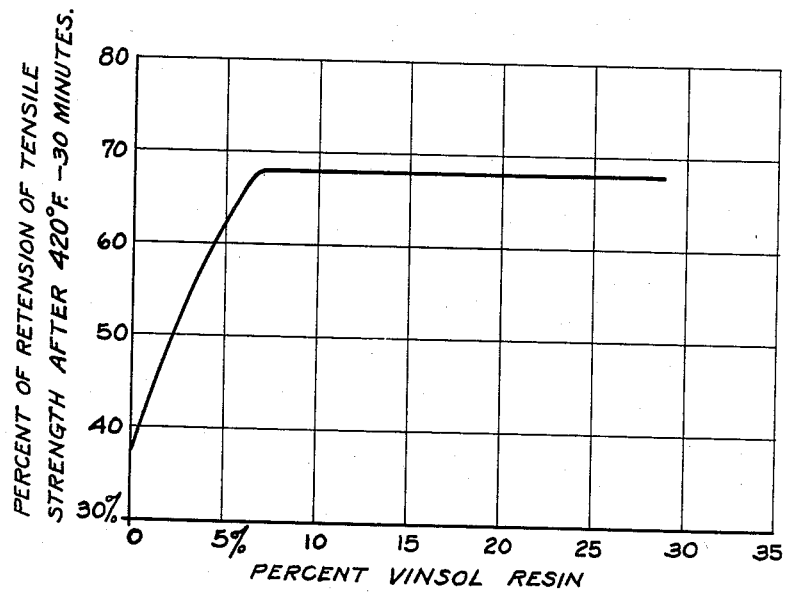

Reference is now made to the accompanying drawings which show the effect obtained by varying the amount of Vinsol in the impregnant composition. In FIG. 1 of the drawing is shown the effect on tensile strength of a unified sheet as the amount of Vinsol resin is increased. In FIG. 2 is shown the percent retention of tensile strength of unified sheet as the amount of Vinsol resin is increased when the sheet is subjected to heat cycle at 420° F. for 30 minutes. The results shown in the graphs of FIGS. 1 and 2 were test data on a control sheet consisting of 27 lb. creped kraft paper impregnated 85% by weight based on dry paper with an impregnant composition having the following recipe.

| Ingredient: | Parts by weight |
| --- | --- |
| Butadiene-acrylonitrile copolymer | 100 |
| Butadien-styrene copolymer | 50 |
| "Aminox" | 1 |

It is observed from the results shown in the graph of FIG. 1 that when the impregnant containing Vinsol resin is employed there is effectuated a marked improvement in tensile strength. In like manner, as shown from the results in the graph of FIG. 2, Vinsol resin also effects definite improvement in retention of tensile strength when a unified sheet is subjected to a heat cycle thus showing the high temperature resistance properties.

The following examples are given to further compare the effectiveness of Vinsol resin in enhancing the tensile strength and percent retention of tensile strength.

EXAMPLE I

A central sheet was prepared by impregnating kraft paper (85% impregnation based on dry weight) with an impregnant of—

| Ingredient: | Parts by weight |
| --- | --- |
| Butadiene-styrene copolymer | 100 |
| ("Aminox") | 1 |

This control sheet had an initial tensile strength of 12 lbs./sq. in. and a 46% retention of tensile strength when subjected to heat cycle at 420° F. for 30 minutes.

A second sample impregnated with the identical impregnant but containing 10 parts Vinsol resin had an initial tensile strength of 16.8 lbs./sq. in. and a 79% retention of tensile strength.

EXAMPLE II

A control sheet was prepared by impregnating kraft paper (85% impregnation based on dry weight) with an impregnant of—

| Ingredient: | Parts by weight |
| --- | --- |
| Crude rubber | 100 |
| ("Aminox") | 1 |

This control sheet had an initial tensile strength of 17 lbs./sq. in. and a 35% retention of tensile strength when subjected to heat cycle at 420° F. for 30 minutes.

A second sample impregnated with the identical impregnant but containing 10 parts Vinsol resin had an initial tensile strength of 21 lbs./sq. in. and a 60% retention of tensile strength.

In forming novel normally tacky and pressure-sensitive adhesive tapes having improved tensile strength, the adhesive that may be used is dependent upon the temperature conditions encountered in use. Wherein the tape is not subjected to elevated temperature conditions any conventional normally tacky and pressure-sensitive adhesive may be employed. An example of such adhesive is one having the following recipe.

*Adhesive A*

| Ingredient: | Parts |
| --- | --- |
| Crude rubber | 100 |
| Rosin dehydrogenated | 90 |
| Aluminum hydrate | 90 |
| Mineral oil | 30 |
| Antioxidant | 2 |

If the tape is to be subjected to high temperature conditions for an extended period, the adhesive should be of such nature that it possesses heat resistant properties. Examples of adhesives possessing such characteristics are those disclosed in applications Ser. No. 611,911, filed September 25, 1956, by Ralf Korpman, and Ser. No. 617,747, filed by Cyrus Bemmels et al. The above referred to adhesives comprise broken down rubber elastomers, tackifying resins and alkyl phenol formaldehyde curing resins. An example of a suitable heat resistant adhesive is as follows:

*Adhesive B*

| Ingredient: | Parts by weight |
| --- | --- |
| Crude rubber | 33.3 |
| Butadiene-styrene (GRS 1002) | 66.7 |
| Zinc oxide | 37.0 |
| Antioxidant | 2 |
| Ditertiary amyl hydroquinone | 20 |
| Piccolyte S-10 (terpene resin) | 160 |

Figure 3:
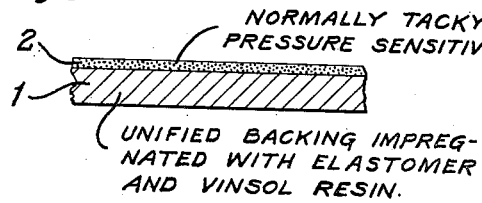

As shown in FIG. 3 of the drawing the novel adhesive tapes of this invention are produced by coating in a conventional manner a normally tacky and pressure-sensitive adhesive 2 such, for example, as Adhesive A or Adhesive B disclosed hereinabove at a coating weight of 1.0 oz./sq. yd. on at least one major surface of a unified sheet 1 formed in accordance with the present invention wherein the impregnant composition contains Vinsol resin.

Although the present invention is chiefly concerned with the impregnation of already formed webs, it should be realized that the principles thereof and also applicable to beater impregnation. In this instance, the Vinsol resin is added to the paper pulp which is subsequently formed into a paper web.

The invention in its broader aspects is not limited to the specific steps, methods, compositions, combinations and improvements described but departures may be made therefrom within the scope of the accompanying claims without departing from the principles of the invention and without sacrificing its chief advantages.

What is claimed is:

1. The method of forming a unified sheet having improved tensile strength which comprises impregnating a fibrous web with an aqueous dispersion of a stable unifying impregnant composition consisting essentially of a rubbery elastomer polymer and a substantially petroleum hydrocarbon insoluble pine wood resin having a melting point of 115° C. in an amount from about 5 to 50% by weight of the unifying composition, and drying said impregnated web.

2. The method of forming a unified sheet according to claim 1 wherein the elastomeric polymer is selected from the group consisting of conjugated diene polymers, conjugated diene copolymers, isoprene polymers, vinyl chloride copolymers, chloroprene and acrylate polymers.

3. The method of forming a unified sheet according to claim 1 wherein the elastomeric polymer is a butadiene-acrylonitrile copolymer.

4. The method of forming a unified sheet according to claim 1 wherein the elastomeric polymer is a butadiene-styrene copolymer.

5. The method of forming a unified sheet according to claim 1 wherein the elastomeric polymer is isoprene.

6. A unified sheet formed in accordance with the method of claim 1.

References Cited in the file of this patent

UNITED STATES PATENTS

| | | |
|---|---|---|
| 2,236,527 | Drew | Apr. 1, 1941 |
| 2,251,273 | Drew | Aug. 5, 1941 |
| 2,399,804 | Hills et al. | May 7, 1946 |
| 2,410,078 | Kellgren | Oct. 29, 1946 |
| 2,601,016 | Hendricks | June 17, 1952 |
| 2,726,967 | Eger | Dec. 13, 1955 |

OTHER REFERENCES

Fisher: "Nomenclature of Synthetic Rubbers," Industrial and Engineering Chemistry, August 1939, vol. 31, No. 8, pp. 941–945.

UNITED STATES PATENT OFFICE
CERTIFICATE OF CORRECTION

Patent No. 3,012,913 December 12, 1961

Winifred C. Collins

It is hereby certified that error appears in the above numbered patent requiring correction and that the said Letters Patent should read as corrected below.

Column 2, line 51, for "combustion" read -- combination --; column 3, lines 5 and 6, for "polyisocyanate" read -- Vinsol --.

Signed and sealed this 21st day of August 1962.

(SEAL)
Attest:

ESTON G. JOHNSON
Attesting Officer

DAVID L. LADD
Commissioner of Patents